United States Patent Office 2,881,992
Patented Apr. 14, 1959

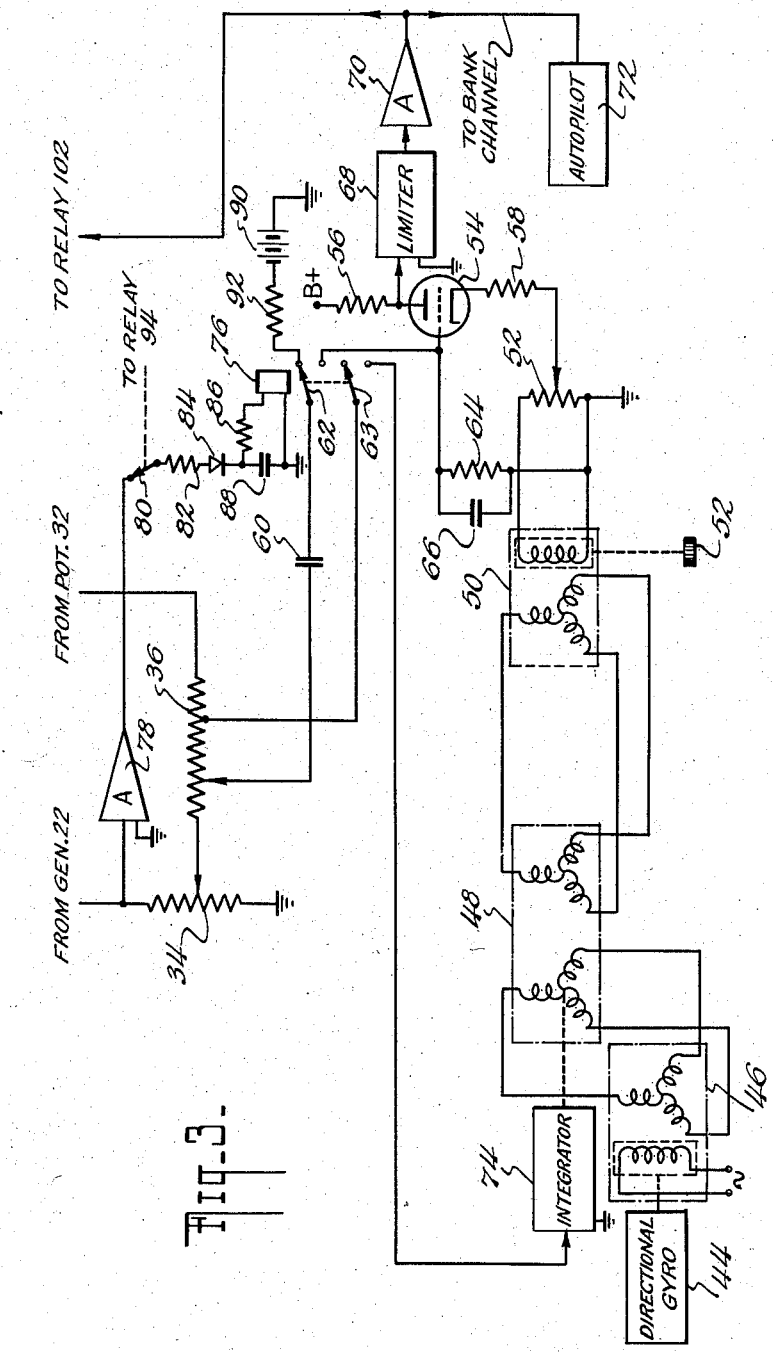

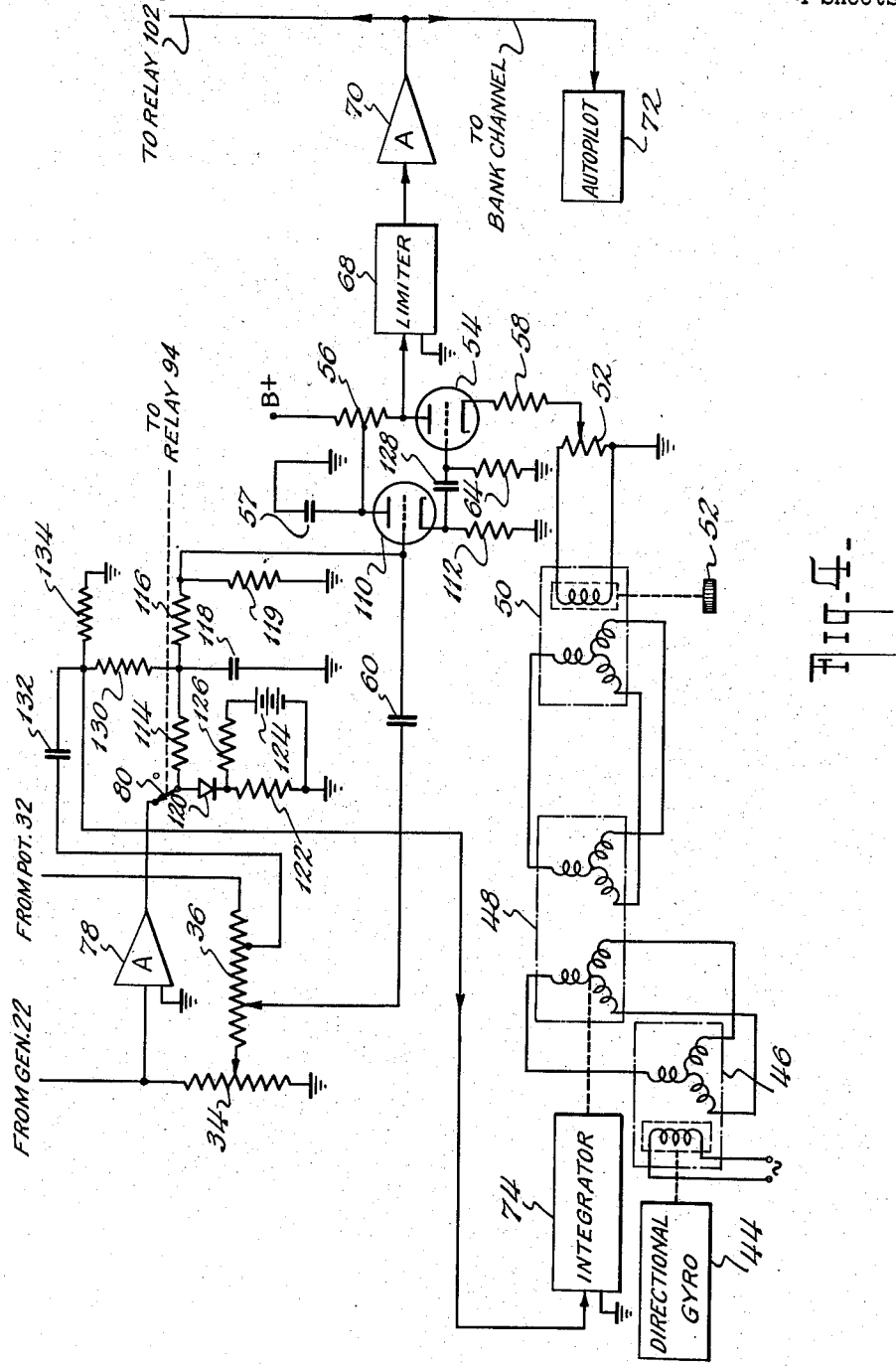

2,881,992

RADIO CONTROLLED CRAFT GUIDING SYSTEM

Herbert Hecht, Wantagh, and Raymond Golstein, Franklin Square, N.Y., assignors to Sperry Rand Corporation, a corporation of Delaware Application August 20, 1956, Serial No. 605,142

20 Claims. (Cl. 244—77)

This invention relates to apparatus for automatically controlling the flight of an airplane along an omni-range beam or other radio defined course, and more particularly, is concerned with means for automatically controlling the airplane in regions, such as over the radio station, where the radio beam becomes extremely erratic.

This application is a continuation-in-part of original U.S. application Serial No. 460,794, filed October 7, 1954, by Herbert Hecht and Raymond Goldstein for Radio Controlled Craft Guiding System, now abandoned.

In the copending application Serial No. 447,176 filed August 2, 1954, now U.S. Patent No. 2,801,059, for Radio Controlled Craft Guidance System by Herbert Hecht and Thomas D. Sloan and assigned to the same assignee as the present invention, there is described a craft guidance system for automatically flying an aircraft from visual-omni-range (VOR) radio information through an autopilot. A displacement error signal derived from VOR receiving equipment carried by the airplane is combined with a heading error signal derived from a directional gyro to produce a bank control signal which is applied to the autopilot to corect and maintain the airplane along a preselected course. It is characteristic of the omni-range system that a zone of signal confusion exists over the radio transmitter. This zone is substantially conical in shape with the apex at the transmitter antenna system and extends roughly a diameter of two and one-half miles at an altitude of five thousand feet. The received signal within this zone of confusion is highly erratic due to the fact that the phase reference signal changes phase by 180°. Heretofore it has been the practice to disconnect the radio guidance when flying over a station and to reconnect it when the signals become steady again.

It is the general object of this invention to provide a radio beam guidance system for an aircraft in which the radio beam guidance is automatically disconnected when the airplane is flying through the zone of confusion over the VOR transmitting station.

Another object of this invention is the provision of a radio controlled automatic flight control system in which the aircraft is flown primarily in response to heading information when the craft is flying over the station and the radio guidance is cut off.

Another object of this invention is to automatically recouple the radio guidance signal after the plane passes through the zone of confusion in a manner to prevent abrupt corrections due to accumulated radio displacement errors.

These and other objects of the invention which will become more apparent as the description proceeds are achieved by the provision of a flight control system utilizing information from a VOR receiver and a directional gyro to provide a lateral beam displacement signal, a beam rate signal, a heading error signal, and an integral signal of beam displacement to the bank channel of an aircraft autopilot. An over-the-station sensor relay, actuated in response to the beam rate signal, disconnects the beam displacement signal and beam rate signal from the autopilot when the beam rate signal exceeds a predetermined amplitude. A bias control circuit actuated by the over-the-station sensor relay controls the bias on an amplifier stage coupling the combined beam displacement and beam rate signals to the autopilot. The bias control circuit is actuated when the over-the-station relay re-engages the beam displacement and beam rate signals in a manner permitting the bias of the amplifier stage to slowly rise from below cut-off. As a result the beam displacement and rate signals are slowly re-engaged to prevent a sudden correction of the aircraft position through the autopilot due to accumulated errors while the over-the-station sensor relay is cut-off.

For a better understanding of the invention reference should be had to the accompanying drawings, in which like reference characters indicate like elements, wherein:

Fig. 3 is a schematic circuit diagram of an alternative embodiment of a portion of Fig. 1;

Fig. 4 is a schematic circuit diagram of an additional embodiment of a portion of Fig. 2.

Figure 1:
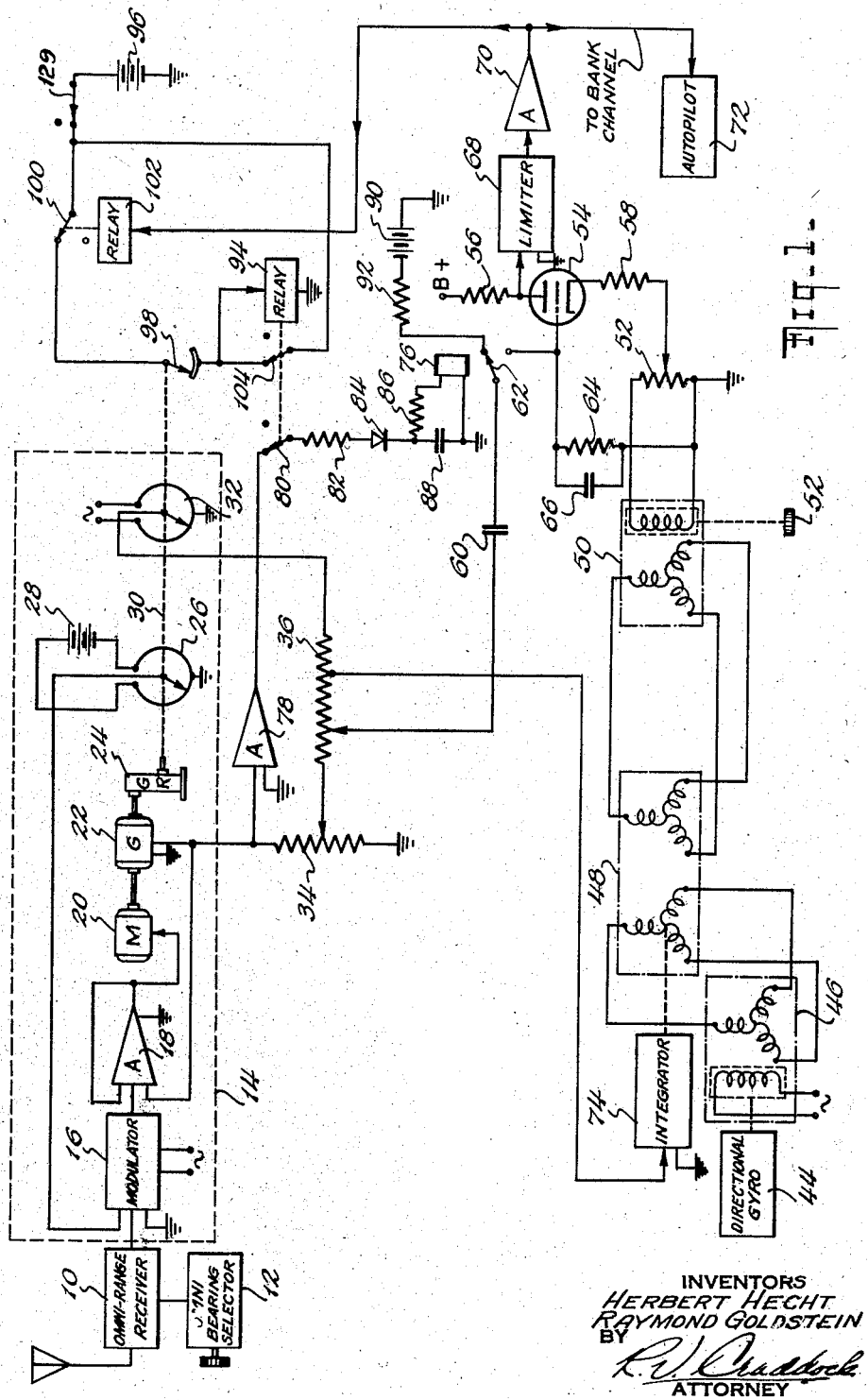
Fig. 1 is a schematic circuit diagram of the flight control system of the present invention.

In the drawings, the numeral 10 indicates generally an omni-range (VOR) receiver which produces a D.-C. signal that goes to zero when the receiver is positioned at a particular azimuth angle with respect to the omnidirectional range radio transmitting station, as selected by the omni-bearing selector 12. A receiver of this type relies upon the detection of amplitude and phase modulation resulting from angular rotation of a special directional antenna pattern at the amni-directional range radio transmitting station. and upon reception of phase reference signals also transmitted from the range station. The output of the receiver is a lateral displacement signal indicative of the off-course position of the aircraft associated with the receiver.

The D.-C. output signal from the omni-range receiver 10 is connected to an electromechanical follow-up servo, indicated generally at 14. This follow-up servo includes a modulator 16, which converts D.-C. signals to A.-C., connected to the output of receiver 10. The A.-C. output signal of the modulator is fed to an amplifier 18 where it is amplified and coupled to a servomotor 20. Thus any output signal from the receiver 10 produces rotation of the servomotor 20, the direction of rotation depending upon the polarity of the displacement error signal from the receiver 10. The servo motor 20 rotates a tachometer generator 22 for generating an A.-C. rate signal which is fed back to the input to the amplifier 18 to provide rate damping.

Coupled to the motor 20 through a suitable gear reducer 24 is the contact arm of a center-tapped potentiometer 26 that is connected across a D.-C. source 28. The potential at the wiper arm of the potentiometer 26 is connected back to the modulator 16 where it is balanced against the output of the receiver 10. With a fixed signal output from the receiver 10, the motor 20 assumes an angular position in which the potential of the wiper arm of the potentiometer 26 exactly balances the output of the receiver 10, so that the angular position at the output shaft, indicated generally at 30, of the follow-up servo 14 is proporitonal to the lateral beam displacement of the aircraft as derived from the receiver 10.

The output shaft 30 from the follow-up servo 14 rotates the wiper arm of a center-tapped potentiometer 32 connected across a suitable A.-C. source. The output signal derived from the wiper contact of the potentiometer 32 is therefore an A.-C. signal which has an amplitude indicative of the lateral displacement of the aircraft from the center of the beam. One of the effects of the servo 14 is to average out small variations in the displacement error signal from the receiver 10, such as may be due to distortion of the radio beam by reflection from objects on the ground. By virtue of the tachometer generator 22 in the servo 14, a signal proportional to the rate of change of beam displacement is also obtained.

The beam rate signal from the tachometer generator 22 is connected across a voltage divider 34, a potentiometer 36 being connected between the contact arm of the potentiometer 32 and the sliding contact of the potentiometer 34. In this manner the beam displacement signal and the beam rate signal are combined, the voltage at the sliding contact of the potentiometer 36 being proportional to the sum of these two signals.

Because of the beam width at large distances from the transmitter, it is essential in automatic flight control of this type to have in addition to the displacement and rate signals, a signal indicative of the heading error of the craft. Such a signal is provided in a conventional manner by means of a directional gyro, indicated generally at 44, which drives a synchro generator 46 in response to changes in heading of the aircraft. Gyro 44 may, for example, be slaved to a flux valve so as to form part of a magnetically slaved gyroscopic compass apparatus. The synchro generator 46 is connected through a differential synchro 48, the purpose of which will be hereinafter explained, to a synchro receiver 50. The desired heading of the aircraft is set into the synchro receiver manually by a heading selector knob 52. Whenever the heading indicated by the directional gyro 44 differs from the selected heading, an output error signal is produced by the synchro receiver 50 across a potentiometer 52.

The combined beam displacement and beam rate signals are mixed with the heading error signal in a signal mixing amplifier including a triode 54 having the plate thereof coupled to a B+ supply through a plate load resistor 56 and the cathode thereof connected through a cathode bias resistor 58 to the sliding contact of the potentiometer 52. The grid of the triode 54 is connected to the output from the potentiometer 36 through a capacitor 60 and a relay-operated single-pole double-throw switch 62. The grid of the triode is provided with a grid leak resistor 64 and high frequency by-pass condenser 66. The time constant of the R-C network comprising the capacitor 60 and the grid leak resistor 64 is quite long so as to introduce negligible phase shift in the A.-C. signal derived from the potentiometer 36.

The combined signal from the mixing amplifier, as derived from the plate of the triode 54, is coupled through a diode limiter 68 and amplifier 70 to the bank control channel of an autopilot 72. The autopilot may be of a known type, such as described in Patent No. 2,567,922. The diode limiter 68 acts to limit the maximum amplitude of the signal to the autopilot, thereby limiting the bank angle of the aircraft to some preselected maximum.

It is further desirable in any automatic flight control system to provide correction for cross-wind. This is done by changing the heading reference so that the aircraft assumes a heading that exactly compensates for side-wise drift due to the cross-winds. To this end an output signal is derived from the potentiometer 36 and fed to an electromechanical integrator 74. The output shaft of the integrator 74 is coupled to the rotatable winding of the differential synchro 48. By rotating the rotor, the integrator circuit 74 introduces a change in the heading reference of the craft. When this correction is just sufficient to overcome the effect of cross-winds, the displacement signal and beam rate signal are reduced to zero and the integrator 74 ceases to rotate the differential synchro 48, so that the system stabilizes with a modified heading of the aircraft just sufficient to counterbalance the effect of cross-winds.

In accordance with the objects of the present invention, the switch 62 is actuated by an over-the-station sensor relay 76, which is actuated in response to erratic changes in the radio beam signal encountered in the zone of confusion above the VOR transmitting station. A signal for actuating the over-the-station sensor relay 76 is preferably derived from the beam rate signal produced by the tachometer generator 22. This beam rate signal is amplified by an amplifier 78, the output of the amplifier 78 being connected through a relay-operated single-pole double-throw switch 80 to resistor 82, crystal rectifier 84 and resistor 86 in series to the relay 76. The values of the resistors 82 and 86 control the signal level at which the relay 76 pulls in, and a capacitor 88 connected across the resistor 86 and relay coil 76 in series introduces a time lag so that short transients will not affect the relay 76.

When the relay 76 is actuated, the combined beam displacement and rate signals are no longer applied to the grid of mixer triode 54 due to the change in the condition of switch 62 caused by relay 76. In this condition, the heading error is the primary control signal which determines the direction of flight of the aircraft as it passes through the zone of confusion. If desired, the heading error signal may be compensated by the integrator 74.

In certain systems, it may be desirable to stop the operation of the integrator 74 simultaneously with the removal of the beam displacement and rate signals from the grid of the mixer triode 54. Referring to Fig. 3 which is a fragmentary portion of the circuit of Fig. 1, an alternative embodiment of this may be accomplished by a switch 63 intermediate the potentiometer 36 and integrator 74. The switch 63 may be ganged to switch 62 such that both switches are simultaneously actuated by the operation of relay 76. The sequence of operation of relay 76 has been previously explained. In systems not using an integrator, some displacement and rate components may be retained.

It is further desirable to provide softening of the correction maneuver which might be called for on the re-establishing of radio beam control after passing through the zone of confusion. Referring again to Fig. 1, this is accomplished by applying an exponentially decaying bias voltage to the grid of the mixing amplifier tube 54 when the radio control signal is re-established by the dropping out of the relay 76. This exponentially decaying bias voltage is achieved by means of a source of potential 90 and series resistor 92 connected to the relay-operated switch 62. When the relay 76 is energized the capacitor 60 is charged to the potential of the source 90. When the relay 76 drops out, connecting the capacitor 60 to the grid of the mixing amplifier tube 54, the negative potential across the capacitor 60 holds the potential of the grid below cut-off. As the charge on the capacitor 60 leaks off through the grid leak resistor 64, the potential on the grid slowly rises above cut-off, and as the potential continues to rise, the gain of the tube 54 increases so that the amplitude of any signal derived from the wiper contact of the potentiometer 36, which is proportional to the sum of the displacement and rate signals derived from the follow-up servo 14, is gradually amplified back to the full level at the output of the mixing amplifier. The time constant of the R-C circuit provided by the capacitor 60 and the resistor 64, and the potential of the source 90 are such that the tube 54 is held below cut-off for three or four seconds and full gain of the tube is not restored for another three or four seconds. In this way complete control of the aircraft along a radio beam is restored gradually after the aircraft passes through the zone of confusion.

It is desirable that the over-the-station sensor relay 76 not be operated during the bracketing phase when the aircraft is first maneuvering to come on to the center of the beam. For this reason an on-course relay 94 is provided which closes the switch 80 only when energized. The relay 94 is connected to a potential source 96 through three switches. The first of these is a sector switch 98, the rotary contact of which is driven by the shaft 30 from the follow-up servo 14. The second switch is a relay-operated switch 100 actuated by a beam sensor relay 102. And the third switch is a manually-actuated normally-closed switch 129 intermediate the switch 100 and source 96. The sector switch 98 is closed only when the aircraft is substantially on the center of the beam as determined by omni-range receiver 10 and follow-up servo 14. The switch 100 is closed only when the relay 102 is de-energized. The relay 102 is actuated in response to the output from the amplifier 70, so that the switch 100 is closed only when there is no signal calling for a bank of the aircraft. Thus the switch 80 is closed only after the aircraft is on the center of the beam and is aligned with the beam.

A relay-operated switch 104, operated by the on-course relay 94, connects the relay 94 to the connection between switch 100 and switch 129. This results in a shorting out of the sector switch 98 and relay switch 100 after the relay 94 is energized, so that during the on-course phase of automatic flight, if large displacement errors are encountered, the relay 94 will not drop out. However, when the omni-bearing selector 12 is actuated to uncouple the craft's control system from one omni-range beam in preparation for the craft's maneuvering to bracket another omni-range beam, the switch 129 is momentarily opened by the pilot to break the holding circuit for relay 94, and thereby reset the relay. Relay 94 will then remain unenergized due to an open condition of switch 98 and/or switch 100 until the craft comes on to the center of the other beam, whereupon it again is energized and held energized by the holding contact 104.

Figure 2:
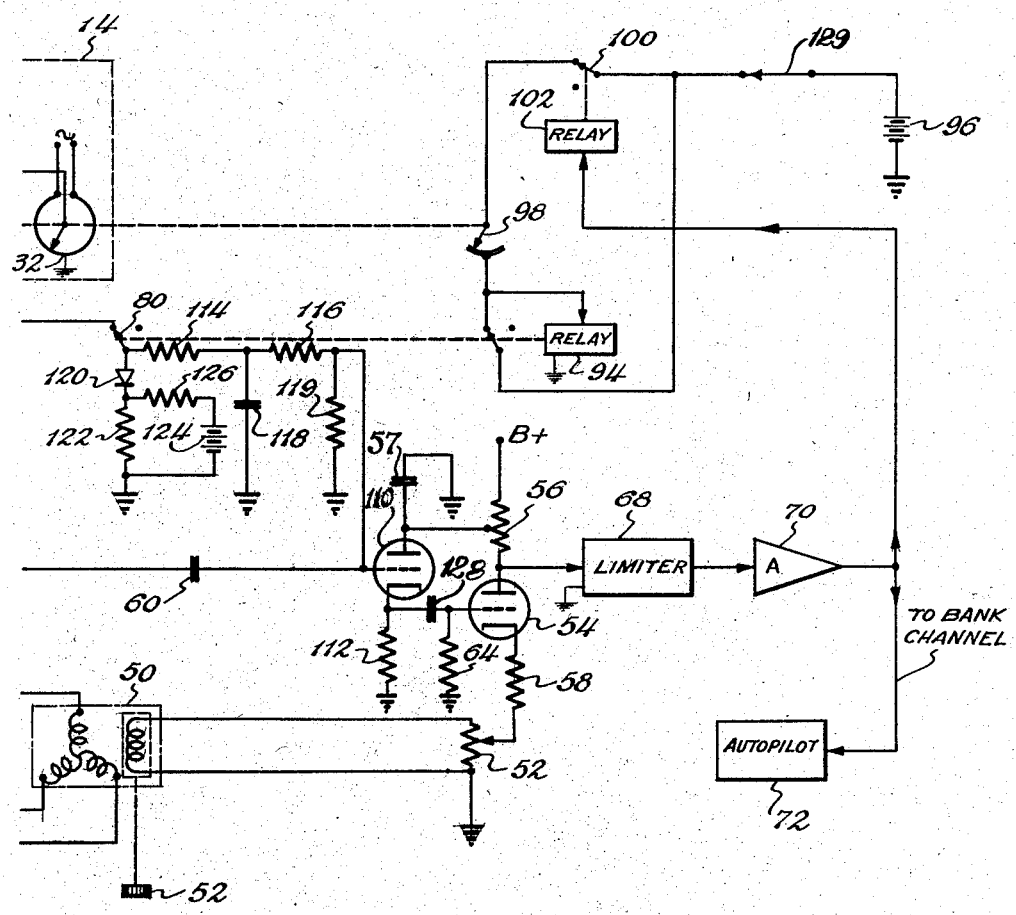
Fig. 2 is a schematic circuit diagram of an alternative embodiment of the invention.

In Fig. 2 is shown an alternative over-the-station sensing circuit which does not use a relay to disable the radio signal but uses bias control on a vacuum tube. The radio-control signal as derived from the wiper arm of the potentiometer 36 (Fig. 1) is coupled through the capacitor 60 to the control grid of a triode 110, which is operated as a cathode follower. The output is taken across a cathode resistor 112 and coupled via an isolating capacitor 128 to the grid of the mixing amplifier tube 54. The plate of the triode 110 is preferably connected to the B+ supply through a portion of the plate load resistor 56, a capacitor 57 decoupling the mixing amplifier 54.

The bias on the control grid of the triode 110 is controlled in response to the output of the tachometer 22 (Fig. 1) by connecting the output of the amplifier 78 through the relay switch 80 to a resistance-capacitance network including series resistors 114 and 116, shunt capacitor 118, and shunt resistor 119. A rectifier 120 is connected in series with a resistor 122 across the output of the amplifier 78, and a potential source 124 in series with a resistor 126 is connected across the resistor 122 to set the voltage level at which the rectifier 120 begins to conduct.

In operation, the resistor 112 sets the bias of the cathode follower tube 110. Any rate signal at the output of the amplifier 78 is shunted by the capacitor 118 and has no effect on the grid of the triode 110 until the amplitude exceeds the potential across the resistor 122. The rate signal is then clipped on the positive half cycles. This produces a negative potential across the capacitor 118 due to the integrating effect of the resistor 114 and capacitor 118 in parallel with the resistors 116 and 119. A voltage proportional to the potential as determined by the ratio of the resistors 116 and 119 is applied to the control grid to cut off the triode 110. The resistor 116 prevents the capacitor 118 from by-passing the radio control signal applied to the grid of the triode 110 to ground. It will be seen that when the output of the amplifier 78 again drops below the level set by the potential source 124, the voltage on the capacitor 118 will gradually leak off through the resistors 116 and 119, so that the bias on the triode 110 is gradually returned to its initial level. In this way the smooth engaging feature described in connection with the circuit of Fig. 1 by the relay 76 is achieved in the modified circuit of Fig. 2.

While the embodiment of the invention of Fig. 2 shows a means for disabling the combined beam displacement and rate signals so that only the heading error signal as corrected by the integrator 74 controls the flight of the aircraft as it passes through the zone of confusion, in certain instances it may also be desirable to discontinue the operation of the integrator 74 thereby controlling the aircraft by a pure heading error signal while in the zone of confusion. This may be accomplished as indicated in Fig. 4 which is an alternative embodiment of a fragmentary portion of the circuit of Fig. 2, by connecting a resistor 130 and a capacitor 132 in series intermediate the junction of resistor 114, resistor 116 and capacitor 118, and the potentiometer 36. The junction of the resistor 130 and capacitor 132 is connected to the integrator 74. Also connected to the junction of the resistor 130 and capacitor 132 is a shunt resistor 134.

In operation, the negative control voltage applied to the control grid to cut off the triode 110 may be similarly applied to the integrator 74 to achieve the same result thereby stopping the integrator 74. The ratio of the resistor 116 to the resistor 119 comprising the voltage divider coupled to the grid of triode 110 may be proportional to the ratio of the resistor 130 to the resistor 134 comprising the voltage divider coupled to the integrator 74 to achieve sequential or simultaneous cut off and operation of triode 110 and integrator 74. The proportionality would be determined by the type of operation desired and the characteristics of the components, for example, whether the triode 110 and the amplifier tube in the integrator 74 were operated with grounded cathodes or as cathode followers. Under certain conditions, the resistor 134 may not be required. The resistor 130 prevents the signal from potentiometer 36 that is coupled through capacitor 132 from being shorted to ground through capacitor 118. The resistor 130 also decouples the circuit which provides a signal to potentiometer 36 from the circuit that provides a signal to capacitor 60. The capacitor 132 provides D.C. isolation between potentiometer 36 and the junction between resistance 130 and capacitor 132. The triode 110 and integrator 74 will be gradually returned to their initial level by the operation of capacitor 118 through the respective voltage dividers as explained previously in relation to Fig. 2.

From the above description, it will be apparent that the various objects of the invention have been achieved by the provision of over-the-station sensing means for disabling the radio control signals and operating the plane from heading information during the time the plane passes through the zone of confusion over the VOR station. While over-the-station sensing has been derived from the beam rate signal from the tachometer generator 22, it is feasible to utilize higher order integrals or differentials of the beam rate signal for initiating over-the-station switching. For example, the motor input signal or the displacement signals might be used. However, the time response of the rate signal to changes in receiver output when flying at moderate speed through the zone of confusion and the noise level of this signal make the output of the tachometer generator 22 preferable.

It should be understood that, although the system described utilizes both displacement and rate signals derived from the VOR receiver, it may be desirable on certain systems to use only one of the rate signals and the displacement signal. In such case, of course, the appropriate radio derived signal would be disabled in the manner described above. While the system is particularly described as disabling the radio control signal when passing over the transmitting station, the system acts to cut out the radio signal whenever it becomes so erratic as to develop a large rate tachometer signal, which may occur due to other disturbances of the VOR beam.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A flight system for an aircraft comprising a radio receiver for producing a lateral beam displacement signal, an electromechanical follow-up servo coupled to the output of the receiver for producing smoothed beam displacement and beam rate signals, means for combining said signals, a capacitor coupled to the output of said signal combining means, signal mixing means, a source of potential, a first single-pole double-throw relay-operated switch for selectively connecting the capacitor to the potential source and to the signal mixing means, an electromechanical integrator electrically connected to the output of said signal combining means, a synchro generator actuated in response to the deviation of said aircraft from a predetermined heading, a differential synchro electrically connected to the synchro generator and mechanically actuated by the integrator, a heading selector synchro receiver electrically connected to the differential synchro, the output of the synchro receiver being connected to said signal mixing means, an autopilot having a bank control channel coupled to the output of the signal mixing means, a first relay for actuating said first switch, means including a second relay-operated switch for coupling the first relay to the beam rate signal output of said follow-up servo, a rotary sector switch mechanically actuated by said follow-up servo, the sector switch having a rotary wiper arm and at least one sector contact, the contact being positioned at the region of movement of the wiper arm corresponding to an on-center beam displacement signal, a bank relay coupled to the output of the signal mixing means, a switch actuated by the bank relay for connecting the wiper arm of the sector switch to a source of potential when the bank relay is deenergized, and a second relay connected to the sector of the sector switch for actuating said second relay-operated switch.

2. A system as defined in claim 1 further including a third single-pole double-throw relay-operated switch actuated by said first relay for selectively disconnecting said electromechanical integrator from said signal combining means.

3. A flight system for an aircraft comprising a radio receiver for producing a lateral beam displacement signal, a follow-up servo coupled to the output of the receiver for producing smoothed beam displacement and beam rate signals, means for combining said signals, a capacitor coupled to the output of said signal combining means, signal mixing means, a source of potential, a first single-pole double-throw relay-operated switch for selectively connecting the capacitor to the potential source and to the signal mixing means, means for producing a signal in response to the deviation in heading of the aircraft from a predetermined heading, means for modifying said heading signal in response to a persistent displacement signal, the modified signal being connected to said signal mixing means, utilization means coupled to the output of the signal mixing means for guiding the aircraft, a first relay for actuating said first switch, means including a second relay-operated switch for coupling the first relay to the beam rate signal output of said follow-up servo, a third switch actuated by said follow-up servo in response to an on-center beam displacement signal, a bank relay coupled to the output of the signal mixing means, a fourth switch actuated by the bank relay, a source of poential, and a second relay, said third and fourth switches when both are actuated connecting the second relay to said source of potential for actuating the relay to close said second switch.

4. A system as defined in claim 3 further including a fifth switch actuated by said first relay for selectively disconnecting said means for modifying said heading signal in response to a persistent displacement signal from said signal combining means.

5. Apparatus for guiding a craft along a selected course as established by a radio beam from a transmitting station, said apparatus comprising means including a radio receiver for producing a first signal and a second signal varying respectively according to the change in beam displacement and beam rate of the craft from said course, means for combining the first and second signals, signal integrating means coupled to the output of the signal combining means, means including a directional device for producing an output varying according to the deviation in heading of the craft from a selected heading, means for producing an output proportional to the difference between the output of the integrating means and the output of the heading indicative means, signal mixing means coupled to the output of said last-named means, means including a capacitor and relay-operated switch for selectively coupling the output of said signal combining means to said signal mixing means, the relay-operated switch connecting the capacitor across a potential source when disconnecting the signal mixing means, a relay for actuating said relay-operated switch, means including a second switch for connecting said relay to the beam rate signal output of the first and second signal producing means, means for actuating said second switch including means responsive to the displacement of the aircraft from the selected course and means responsive to the output of said signal mixing means, and utilization means responsive to the output of the signal mixing means for guiding the craft.

6. Apparatus as defined in claim 5 further including means including a third switch responsive to said relay for selectively disconnecting said signal integrating means from said signal combining means.

7. Apparatus for guiding a craft along a selected course as established by a radio beam from a transmitting station, said apparatus comprising means including a radio receiver for producing a first signal and a second signal varying respectively according to the change in beam displacement and beam rate of the craft from said course, means for combining the first and second signals, signal integrating means coupled to the output of the signal combining means, means including a directional device for producing an output varying according to the deviation in heading of the craft from a selected heading, means for producing an output proportional to the difference between the output of the integrating means and the output of the heading indicative means, signal mixing means coupled to the output of said last-named means, means including a capacitor and relay-operated switch for selectively coupling the output of said signal combining means to said signal mixing means, the relay-operated switch connecting the capacitor across a potential source when disconnecting the signal mixing means, a relay for actuating said relay-operated switch, means for connecting said relay to the beam rate signal output of the first and second signal producing means, and utilization means responsive to the output of the signal mixing means for guiding the craft.

8. Apparatus as defined in claim 7 further including means including a second relay-operated switch actuated by said relay for selectively disconnecting said signal integrating means from said signal combining means.

9. Apparatus for guiding a craft along a selected course as established by a radio beam from a transmitting station, said apparatus comprising means including a radio receiver for producing a first signal and a second signal varying respectively according to the change in beam displacement and beam rate of the craft from said course, means for combining the first and second signals, means including a directional device for producing an output varying according to the deviation in heading of the craft from a selected heading, signal mixing means coupled to the output of said last-named means, means including a capacitor and relay-operated switch for selectively coupling the output of said signal combining means to said signal mixing means, the relay-operated switch connecting the capacitor across a potential source when disconnecting the signal mixing means, a relay for actuating said relay-operated switch, means for connecting said relay to the beam rate signal output of the first and second signal producing means, and utilization means responsive to the output of the signal mixing means for guiding the craft.

10. An aircraft automatic flight control system for guiding an aircraft along a radio-defined course established by a ground transmitting station, said system comprising at the aircraft, receiving means for producing a radio control signal in response to the lateral displacement of the aircraft from a preselected course, means for providing a heading control signal in response to the deviation of the aircraft from a preselected heading, a summing amplifier coupled to said displacement responsive means and said deviation responsive means for mixing said control signals, over-the-station sensing means including a relay actuated by the receiving means in response to erratic changes in the received radio signal when flying over the ground transmitting station for uncoupling said displacement responsive means from said summing amplifier as long as said changes persist, bias control means including a resistance-capacitance delay circuit forming part of the coupling between said summing amplifier and said displacement responsive means, said bias control means gradually restoring the gain of said summing amplifier when said displacement responsive means is recoupled to said summing amplifier, and utilization means responsive to the output of said summing amplifier for guiding the aircraft.

11. An aircraft automatic flight control system for guiding an aircraft along a radio-defined course established by a ground transmitting station, said system comprising at the aircraft, receiving means for producing a radio control signal in response to the lateral displacement of the aircraft from a preselected course, means for producing a heading control signal in response to the deviation of the aircraft from a preselected heading, means coupled to said displacement responsive means and to said deviation responsive means for mixing said control signals, means actuated by the receiving means in response to erratic changes in the received radio signal for uncoupling said displacement responsive means from said mixing means as long as said changes persist, means including means forming part of the coupling between said displacement responsive means and said mixing means for initially increasing the radio control signal gradually from zero to the maximum amplitude as established by the receiving means when said displacement responsive means is recoupled to said mixing means, and utilization means responsive to the output of the signal mixing means for guiding the aircraft.

12. An aircraft automatic flight control system for guiding an aircraft along a radio-defined course established by a ground transmitting station, said system comprising at the aircraft, receiving means for producing a radio control signal in response to the lateral displacement of the aircraft from a preselected course, means for producing a heading control signal in response to the deviation of the aircraft from a preselected heading, means coupled to said displacement responsive means and said deviation responsive means for mixing said control signals, means actuated by the receiving means in response to erratic changes in the received radio signal when flying over the ground transmitting station for uncoupling said displacement responsive means from said mixing means as long as said changes persist and utilization means responsive to the output of the signal mixing means for guiding the aircraft.

13. Apparatus as defined in claim 12 further including integrating means responsive to the radio control signal, and means for combining the output of the integrating means with the output of the heading responsive means for modifying the heading control signal in response to the time integral of the radio control signal.

14. Apparatus as defined in claim 13 in which said means actuated by the receiving means in response to erratic changes in the received signal when flying over the ground transmitting station further includes means for rendering said integrating means unresponsive to said radio control signal as long as said changes persist.

15. An aircraft automatic flight control system for guiding an aircraft along a radio-defined course established by a ground transmitting station, said system comprising at the aircraft, receiving means for producing a radio control signal in response to the lateral displacement of the aircraft from a preselected course, means for producing a heading control signal in response to the deviation of the aircraft from a preselected heading, means coupled to said displacement responsive means and said deviation responsive means for mixing said control signals, utilization means responsive to the output of the signal mixing means for guiding the aircraft, an electronic discharge device having a control grid, the displacement responsive means being coupled to said mixing means through said discharge device, and means for controlling the bias on the control grid of said discharge device in response to erratic changes in the received radio signal to bias the discharge device off and thereby interrupt the response to said utilization means to that portion of the output of said mixing means due to said radio control signal.

16. An aircraft automatic flight control system for guiding an aircraft along a radio-defined course established by a ground transmitting station, said system comprising at the aircraft, receiving means for producing a radio control signal in response to the lateral displacement of the aircraft from a preselected course, utilization means coupled to the receiving means and responsive to said radio control signal for guiding the aircraft, means actuated by the receiving means in response to erratic changes in said radio signal for uncoupling the receiving means from said utilization means as long as said changes persist, and means actuated by said uncoupling means for initially increasing the radio control signal from zero to maximum amplitude as established by the receiving means when radio control is re-established.

17. An aircraft automatic flight control system for guiding an aircraft along a radio-defined course established by a ground transmitting station, said system comprising at the aircraft, receiving means for producing a radio control signal in response to the lateral displacement of the aircraft from a preselected course, utilization means responsive to the radio control signal for guiding the aircraft, and over-the-station sensing means actuated by the receiving means in response to erratic changes in the received radio signal when flying over the ground transmitting station for interrupting the response of said utilization means to said radio control signal as long as said changes persist.

18. In an aircraft guidance system including radio means for measuring the position of the aircraft relative to a radio defined course and utilization means for use in guiding the craft in response thereto, apparatus for disconnecting the utilization means from the radio means when the radio signal becomes erratic, said apparatus comprising means for producing a rate signal proportional to the rate of change of the displacement of the aircraft from the radio defined course, a relay, means for actuating the relay in response to the rate signal when the rate signal exceeds a predetermined magnitude, means for generating a decay signal, and means actuated by the relay for connecting the decay signal to the utilization means simultaneously with the connecting of the output from the radio means to the utilization means, whereby the response of the utilization means to the output of the radio means is initially modified in response to the decay signal.

19. In an aircraft guidance system including radio means for measuring the position of the aircraft relative to a radio defined course and utilization means for use in guiding the craft in response thereto, apparatus for disconnecting the utilization means from the radio means when the radio signal becomes erratic, said apparatus comprising means for producing a rate signal proportional to the rate of change of the displacement of the aircraft from the radio defined course, an electronic tube having a control grid for coupling the radio means to the utilization means, and means for controlling the bias on the control grid of said tube, said last-named means including a resistance-capacitance network connected to the control grid of said tube and means responsive to the rate signal connected to the control grid of said tube for producing a negative bias voltage when the rate signal reaches a predetermined magnitude, to bias the tube below cut-off, said network holding the grid below cut-off and gradually restoring the control grid to normal bias after the rate signal drops below said predetermined magnitude.

20. An aircraft automatic flight control system for guiding an aircraft along a radio-defined course established by a ground transmitting station, said system comprising at the aircraft, receiving means for producing a first signal and a second signal varying respectively according to the change in beam displacement and beam rate of the craft from said course, means for producing a heading signal in response to the deviation of the aircraft from a preselected heading, means coupled to both the aforesaid means for mixing said signals, integrating means responsive to said first and second signals, means for combining the output of the integrating means with the output of the heading responsive means for modifying the heading control signal in response to the time integral of the first and second signals, means actuated by said receiving means in response to erratic changes in the received radio signal when flying over the ground transmitting station for selectively rendering both said mixing means and said integrating means unresponsive to said first and second signals, and utilization means responsive to the output of the signal mixing means for guiding the aircraft.

No references cited.